United States Patent [19]

Porcella

[11] 4,295,192
[45] Oct. 13, 1981

[54] ROW ADDRESS MEMORY MAP OVERLAP

[75] Inventor: Brewster J. Porcella, Tustin, Calif.

[73] Assignee: Sperry Rand Corporation, New York, N.Y.

[21] Appl. No.: 29,697

[22] Filed: Apr. 13, 1979

[51] Int. Cl.³ ............................................. G11C 13/00
[52] U.S. Cl. ..................................... 364/200; 365/189
[58] Field of Search ........................ 365/189; 364/200

[56] References Cited

U.S. PATENT DOCUMENTS 3,854,126  12/1974  Gray et al. ........................... 364/200

*Primary Examiner*—Terrell W. Fears
*Attorney, Agent, or Firm*—G. Donald Weber, Jr.; Eugene T. Battjer; William E. Cleaver

[57] ABSTRACT

There is described a map memory system with a time-multiplexed memory address bus wherein the mapping function is performed on the high order address bits in parallel with the output of the low order address bits on the time multiplex bus.

16 Claims, 7 Drawing Figures

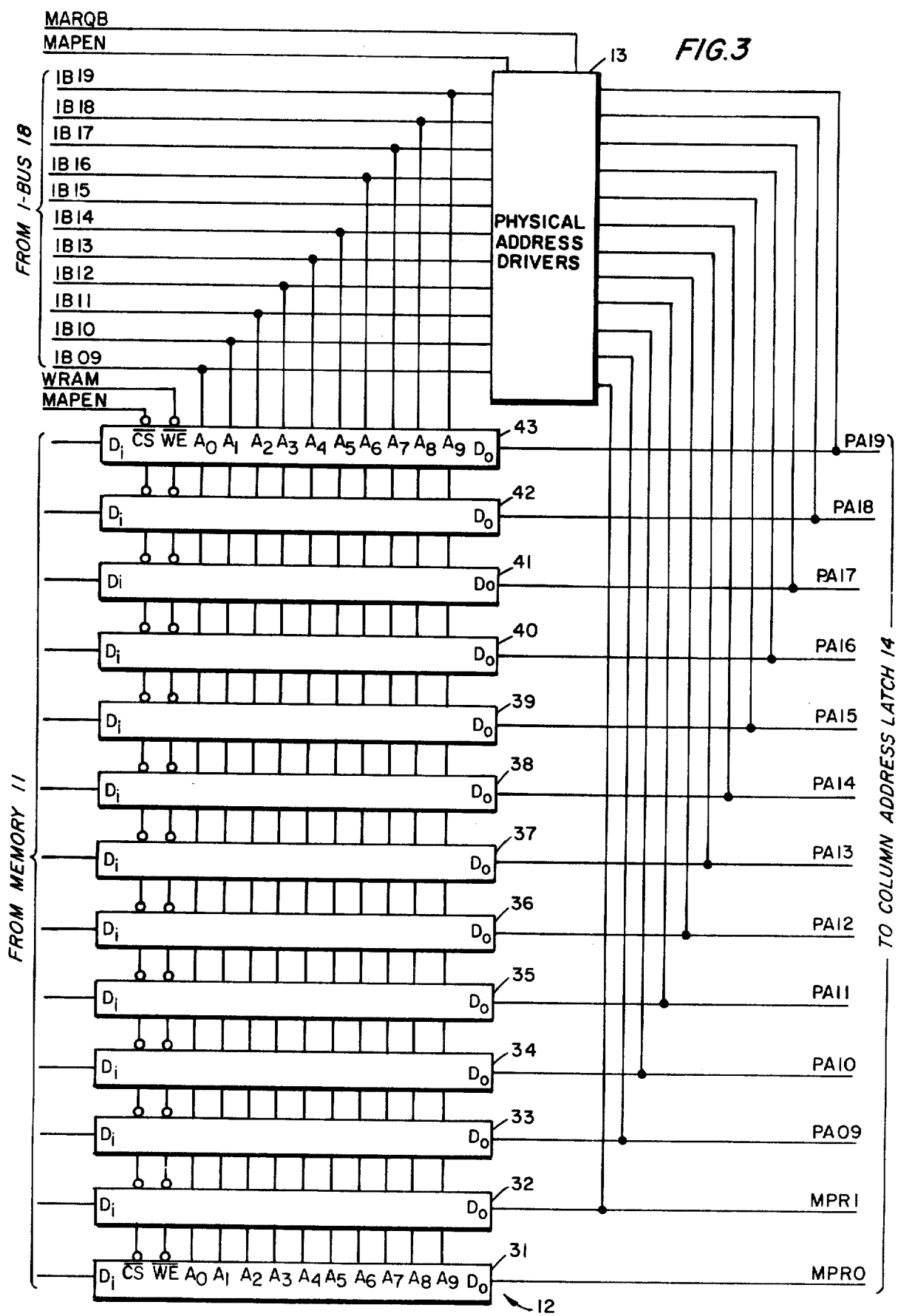

ROW ADDRESS MEMORY MAP OVERLAP

BACKGROUND OF THE INVENTION

1. Field of the Invention

This invention is directed to a mapped memory system, in general, and, more particularly, to a mapped memory system wherein higher speed of operation is obtained with no performance penalty.

2. Prior Art

Memory mapping techniques are known in the art. These techniques are utilized in order to effectively enlarge the memory content of the actual memory system capabilities. With mapping techniques, may arrays are provided to establish virtual memories which can be accessed or addressed through the map memory thereby increasing the apparent storage capacity and addressing capability of the system. In addition, the technique provides logical address space for programs in a multi-program and multi-tasking environment.

In the known mapping techniques, the central processor unit (CPU) supplies an address to the map array which performs the appropriate mapping technique. The map array then reformats the address word and applies this reformatted word to the memory to perform the appropriate function such as fetching the appropriate information in the memory portion addressed. However, this technique is relatively time consuming and expensive in terms of the hardware and components which are utilized in the system.

SUMMARY OF THE INVENTION

In the system described herein, a CPU or similar device can apply an address word to the map and the memory. A portion of the address word (e.g., the higher order bits) is supplied to the map array in order to control the function thereof and to effect the transfer of the system to the map memory function. The lower order bits of the address word are applied directly to an array address multiplexer which produces output signals representative of the input address word. The output signals from the map array are then supplied, through a latching circuit, to the array address multiplexer to produce output signals with respect thereto. Depending upon the control signal supplied to the multiplexer, the output signals produced by the multiplexer are produced wherein the entire address word is effectively operated upon substantially concurrently wherein the mapping process is effected in the same time frame which is normally required for a non-mapped operation.

BRIEF DESCRIPTION OF THE FIGURES OF THE DRAWINGS

FIG. 3 is a detailed block diagram of the map and the associated physical address drivers.

DESCRIPTION OF THE PREFERRED EMBODIMENT

Figure 1:
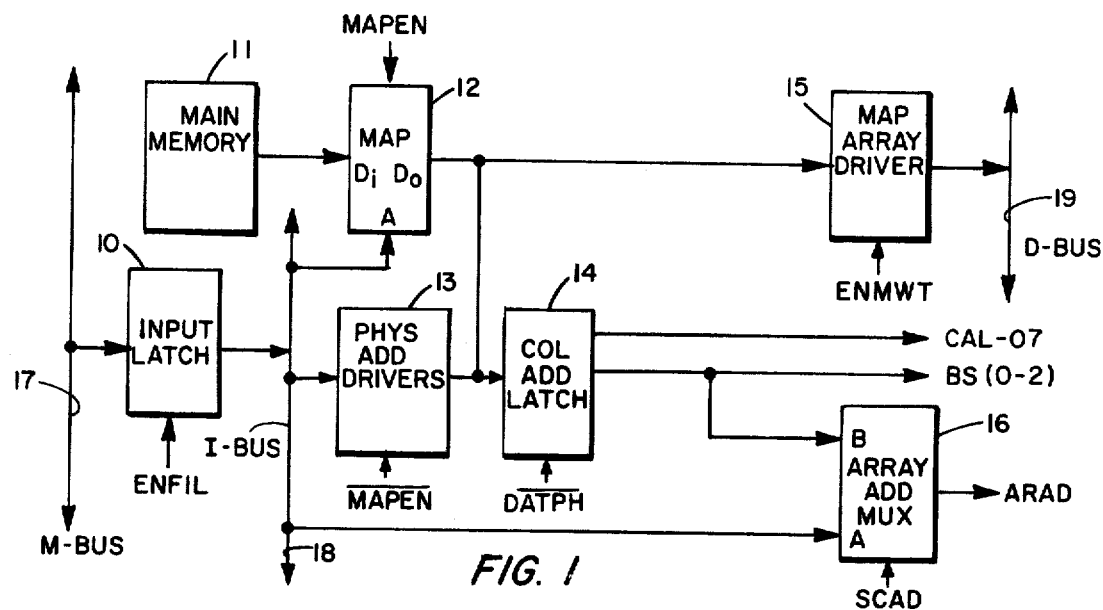
FIG. 1 is a block diagram of the memory system of the instant invention.

Referring now to FIG. 1 there is shown a block diagram of the mapping circuit of the instant invention. Input latch circuit 10 is connected to receive signals from the main (or M) bus 17. The output signals from input latch 10 are provided to internal (or I) bus 18. Certain of the signals on I-bus 18 are provided to input terminals of the physical address driver circuit 13 and to the A input terminals of map 12. In addition, certain others of the signals on I-bus 18 are applied to the A input terminals of array address multiplexer 16. Moreover, map 12 is connected to receive signals from memory circuit 11 at the $D_i$ input terminal. The output terminal $D_o$ of map 12 is connected to supply output signals to map array driver circuit 15 when the contents of map 12 are to be returned to memory 11. Also, the $D_o$ terminals are connected to input terminals of column address latch 14 which terminals are also connected to receive output signals from physical address driver circuit 13. The output terminals of map array driver 15 are connected to the D-bus 19. Column address latch 14 provides signals which are supplied to the B input terminals of array address multiplexer 16. In addition, latch 14 provides output signals CAL07 and BS(0-2) which latter signals are the board select signals. Also, array address multiplexer 16 produces output signals ARAD (6-0).

In operation, input signals are supplied from the CPU or other device requiring memory access along memory bus 17. These signals are supplied to input latch circuit 10. When the enabling signal ENFIL is supplied to the enabling input of latch 10, the data or address bits which are supplied along M-bus 17 are latched in latch circuit 10. The latch enabling signal ENFIL is supplied at an appropriate time controlled by external circuitry which permits the signals on M-bus 17 to have "settled" and to provide appropriate signals in latch 10. Once the signals are latched in latch 10, the signals are applied to I-bus 18 and transmitted therethrough to the various locations for receiving the signals. In particular, certain bits (i.e. lower order bits) of the new address word on I-bus 18 are applied to the A input terminals of array address multiplexer 16. The remaining bits (i.e. higher order bits) are applied to the A input terminals of map 12 and to physical address driver 13. The application of the signals to the A terminals of map 12 selectively permits memory 11 to supply signals and bits to map 12 during the loading of the map for subsequent operation. This selection is controlled by the application of the map enable signal MAPEN. That is, if the signal MAPEN is supplied, then map 12 is enabled and the information which was loaded into map 12 from memory 11 under the control of external circuitry, not shown, is operated upon by the bits from I-bus 18 to produce output signals at terminal $D_o$. Conversely, if the signal $\overline{MAPEN}$ is applied, then map 12 is not enabled but physical address driver circuit 13 is enabled wherein the signals on I-bus 18 are applied to physical address driver 13 and produce output signals representative thereof. In point of fact, physical address driver 13 is shown and described only for information and does not, in fact, form a portion of the invention, per se.

The output signals from either map 12 (in the mapping operation) or physical address drivers 13 (in the unmapped operation) are applied to map array driver 15 and to column address latch 14. When the data phase signal DATPH is supplied to latch 14, (again, after a suitable time for settling of the information applied thereto) output signals are produced by latch 14. Certain of these signals are applied to the B input terminals of array address multiplexer 16.

With the application of control signal SCAD, multiplexer 16 produces the signals representative of the row address signals from terminal A on the output terminal ARAD. When the control signal SCAD is negative, the column address at terminal B of multiplexer 16 is transferred to the output terminal ARAD. Thus, it is seen that the information is transferred from M-bus 17 to I-bus 18 through the operation of input latch 10. The signals at I-bus 18 are applied immediately to terminals A of array address multiplexer 16 and, through map 12 and column address latch 14 to terminal B of multiplexer 16 during the time required for the row address to be operated upon by the memory 12. Depending upon the operation of control signal SCAD, the row or column address signals are applied to the output terminal ARAD within substantially the same time frame wherein the address has been mapped with no loss of timing and no loss in performance.

Figure 2:
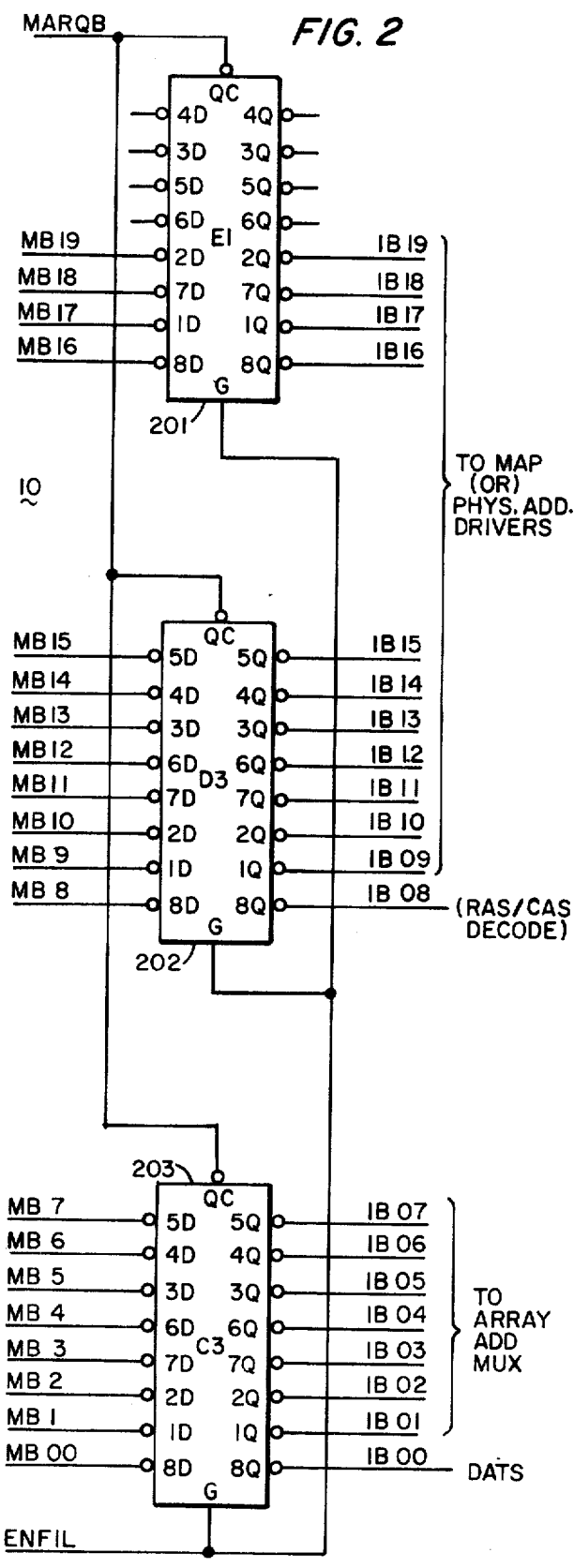
FIG. 2 is a detailed block diagram of an input latch.

Referring now to FIG. 2, there is shown a more detailed version of input latch 10. In particular, input latch 10 includes, in this embodiment, three latching circuits 201, 202 and 203, respectively. The input terminals of the latch circuits are connected to M-bus 17 to receive the address and/or data bits MB00 through MB19. In particular, the bits MB00 through MB07 are supplied to the input terminals of latch 203. Likewise, bits MB8 through MB15 are supplied to latch 202 and bits MB16 through MB19 are supplied to the input terminals of latch 201. Likewise, the enabling signal ENFIL is supplied to the enabling input terminal of each of latches 201, 202 and 203. Also, the control signal MARQB is provided to the output enable terminal Qc of the respective latches. The output terminals of the respective latches are connected to appropriate system components. For example, the output terminals which supply output signals IB01 through IB07 are connected to the array address multiplexer as described hereinafter. The output signal IB00 is used to define the data select signal DATS.

The output terminals of latch 202 produce the output signals IB08-IB15 which are provided to I-bus 18 along with the signals IB16-IB19 at the output terminals of latch 201. In particular, signals IB09-IB14 and IB16-IB19 are provided to the map 12. The signals IB09-IB19 are all supplied to physical address driver circuit 13 as described hereinafter. The signal IB08 is used as the RAS decode signal. The output signal IB15 is used in external circuitry and is not pertinent to the invention, per se.

In operation, the message bits MB00-MB19 are provided along M-bus 17 in the usual fashion. Signals are supplied to the input terminals of the respective latch circuits. With the application of the enabling signal ENFIL, the latches are set and the signals at the input terminals are latched and provided at the output terminals of the respective latches. The signal MARQB is an internal map request signal which is used only to request a transfer of bits from main memory 11 to the map 12 and vice versa.

The output signals from the respective latches are supplied to I-bus 18 as noted supra. The specific signals are applied to the appropriate circuit components as described and shown previously. In addition, the DATS, RAS and, CAS signals are generated and then applied to effect appropriate control operations in other elements and components as described hereinafter.

Referring now to FIG. 3, there is shown a schematic diagram of the map circuit 12 used in the instant invention. In particular, the map comprises a plurality of memory chips 31-43. In the particular embodiment shown, the map array comprises 13 chips of 1K memory. The input terminal $D_i$ of each of the arrays is connected to memory 11 to receive a data bit therefrom. This data bit is fully corrected and parity checked in accordance with suitable procedures such as those described in the copending application entitled "Optimization of Error Detection and Correction Circuit" by B. J. Porcella filed Apr. 9, 1979, bearing Ser. No. 28,213, and assigned to the common assignee. In addition, each of the memory arrays receives the map enable signal MAPEN which selectively enables the mapping operation. The signal WRAM also applied to each memory chip for the purpose of loading the map array with the proper mapping information from the memory 11.

As shown in FIGS. 1 and 2, portions of the I-bus are connected to the map array. In particular, I-bus bits IB09 through IB14 and IB16 through IB19 are connected to the input terminals of the map memory chips. The same signals, along with I-bus signal IB15, the inverse map enable signal, $\overline{\text{MAPEN}}$, and the MARQB map request signals are applied to physical address driver circuit 13. Circuit 13 is not described in detail inasmuch as it forms no portion of this invention, per se. The output terminals of physical address driver 13 and map 12 are connected together and to column address latch 14 to provide signals PA09-PA19 along with the memory protect signals MPR0, MPR1.

In operation, the map arrays 31 through 43 are connected to memory circuit 11 to selectively receive signals therefrom. In addition, the I-bus terminals are connected to both the physical address driver circuit 13 and the memory chips 31-43. With the application of the map enable signal MAPEN, the map array is enabled and the signals on the I-bus are utilized to select the address in the map array which, thus, selects the address in the memory 11 which is being mapped. Conversely, with the application of the inverse map enable signal, i.e. $\overline{\text{MAPEN}}$, the map is not enabled and the physical address driver circuit 13 operates to apply the signals from the I-bus directly to the column address latch circuit 14. However, this is an alternative operation and forms no part of the invention, per se.

As noted in the map enabled situation, the I-bus signals select the appropriate memory address and transfer these signals to the column address latch 14 as the signals PA09-PA19. In addition, the memory protection signals MPR0 and MPR1 are applied from map 12 to column address latch 14 to protect the contents of the memory from erroneous operation. Thus, it should be noted that in the map enabled situation, the signals IB00-IB07 are supplied directly to the A input terminals of array address multiplexer 16 and the map signals PA09 through PA19 are applied to the column address latch circuit in the time required for proper memory operation. Thus, it can be considered that signals IB00 through IB07 are, effectively, applied to the array address multiplexer 16 and, substantially concurrently, the bits IB09 through IB19 are applied to the column address latch 14.

Figure 4:
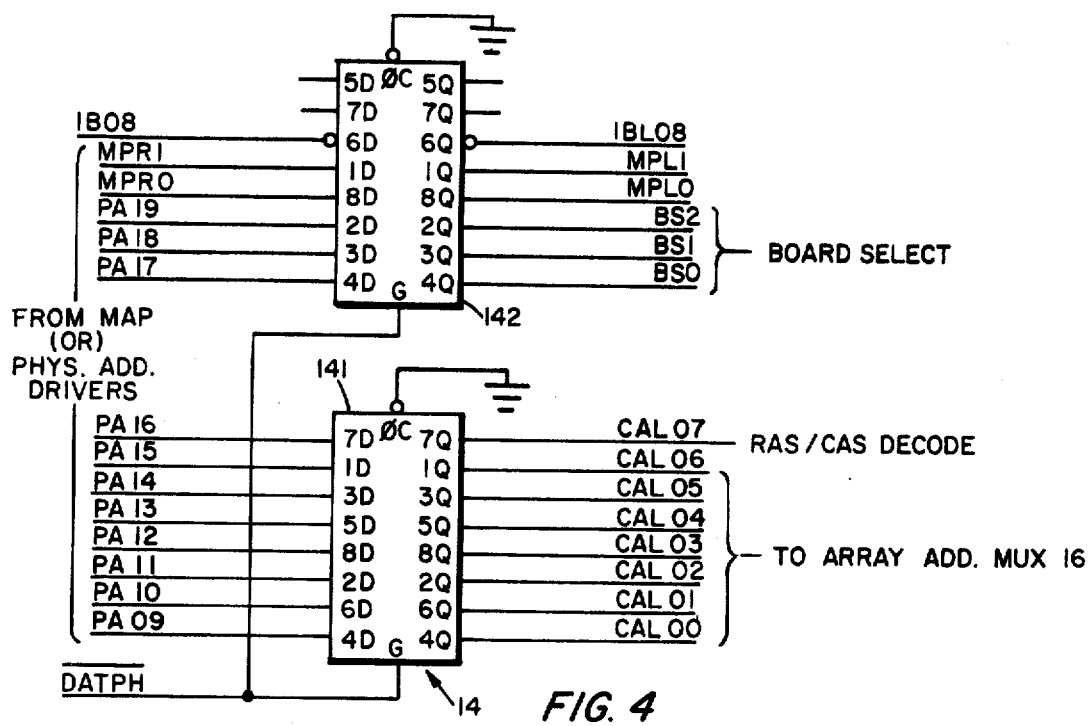
FIG. 4 is a detailed block diagram of a column address latch.

Referring now to FIG. 4, there is shown a block diagram of the column address latch circuit 14. Circuit 14 comprises, in this embodiment, a pair of latch circuits 141 and 142 which are similar to the latch circuits shown and described relative to FIG. 2. Latch circuit 141 receives input signals PA09 through PA16 while latch circuit 142 receives input signal PA17 through PA19, MPR0, MPR1 and IB08 (from I-bus 18). In addition, each of the latches receives the data phase signal DATPH which functions similarly to the enabling signal ENFIL in FIG. 2. The output signals from latch 141 are identified as CAL00 through CAL06 which are supplied directly to the array address multiplexer 16. In addition latch 141 produces the output signal CAL07 which is used to decode the CAS bit as noted hereinafter. The output signals from latch 142 provide board select signals BS0-BS2 as well as the memory protect signals MPL0 and MPL1 and the decoding signal IBL08 as described hereinafter.

In operation, the input signals from the map or physical address drivers are supplied to the input terminals of latches 141 and 142 as shown. With the application of the data phase signal $\overline{\text{DATPH}}$ to the enabling input terminal, the latches are enabled and the signals at the input terminals are transferred to and latched at the output terminals thereof. The output signals from latch 141 are then applied to array address multiplexer 16 as noted and are ready to be detected thereat. In addition, the board select signals BS0-BS2 are provided to the board select circuitry which is used to control the selection of the boards on which the main memory arrays are located. The output signals IBL08 and CAL07 are used to provide RAS/CAS signals to decode the word address of the data words of the main memory.

Figure 5:
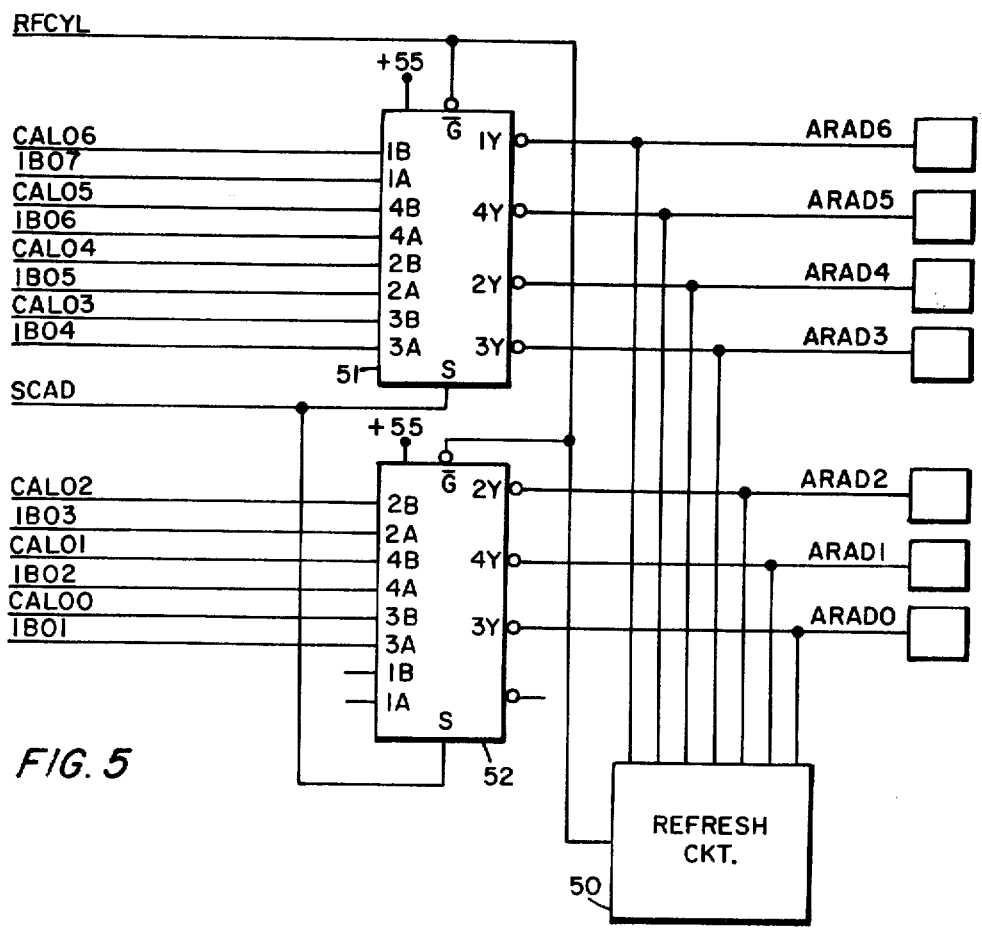
FIG. 5 is a detailed block diagram of the array address multiplexer and the associated refresh circuitry.

Referring now to FIG. 5, there is shown a block diagram of the array address multiplexer 16 which comprises, in this embodiment, a pair of multiplexer circuits 51 and 52. Multiplexer 52 receives the signals CAL00-CAL02 and the signals IB01-IB03 from the column address latch 14 and the I-bus 17, respectively. Likewise, multiplexer 51 receives signals CAL03-CAL06 and IB04-IB07 from the column address latch 14 and the I-bus 17, respectively. In addition, each of the multiplexers receives the control signal SCAD and the refresh cycle signal RFCYL which is supplied to refresh circuit 50. Refresh circuit 50 is used to refresh the main memory in a typical manner and does not form a portion of the circuit of the invention, per se. The output terminals of multiplexer 52 produce array address driver signals ARAD0 through ARAD2 while multiplexer 51 produces output signals ARAD3-ARAD6.

In operation, the respective input signals are supplied to the multiplexers as shown. It will be noted that the CAL signals are supplied to the B input terminals while the IB signals are supplied to the A input terminals of the multiplexers. In this embodiment, when the control signal SCAD is at one level, e.g., a binary 1, the B side of the multiplexers is connected to the output terminals. Conversely, when the control signal SCAD is a binary 0, the A side of the multiplexer is connected to the output terminals. Thus, it is seen that the portion of the data word at input latch 10 is instantaneously available at the A side of the multiplexer 16 while the mapped portion of the information on I-bus 18 is also available substantially concurrently at the B side of multiplexer 16. Consequently, with the application of the control signal, the A side of the multiplexer is detected first and the B side is detected thereafter. As a result, with virtually no loss in time or performance, the word on the I-bus 17 has been mapped and the mapped word is applied to the array address bus.

Figure 6:
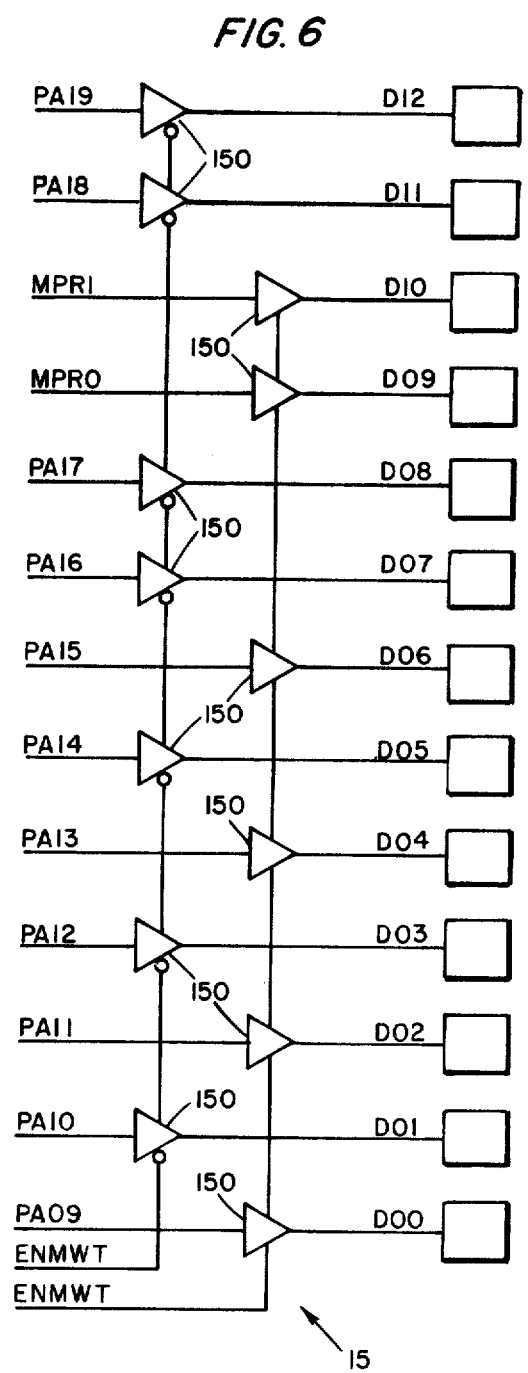
FIG. 6 is a detailed block diagram of a map array driver.

Referring now to FIG. 6, there is shown a schematic diagram of the map array driver 15. Map array driver 15 comprises a plurality of drivers 150 that are connected to receive signals from the map 12 and/or physical address driver circuit 13. These drivers apply the input signals to output terminals for the purpose of selectively returning information from map 12 to the main memory 11 via D-bus 19.

Figure 7:
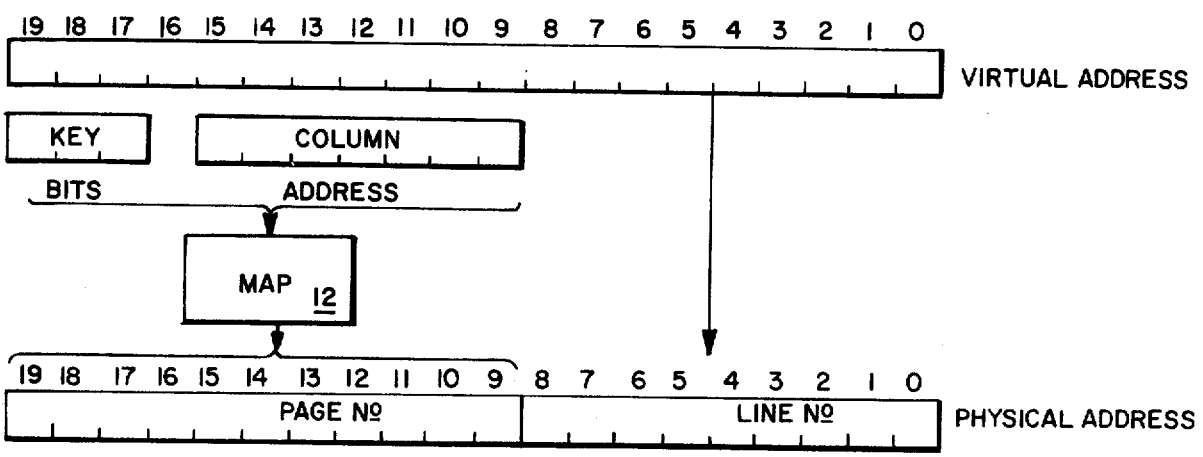
FIG. 7 is a schematic representation of the transformation of a virtual address into a physical address.

Referring now to FIG. 7, there is shown a diagramatic representation of the operation of the circuit shown and described above. In particular, there is shown the virtual address which is represented by an address format comprising bits 0 (least significant bit) to 19 (most significant bit). These bits represent the bits MB (19-00) which are applied on M-bus 17. These bits are then transferred to I-bus 18 and latched thereat by input latch 10. With this circuit arrangement, it is considered that the nine least signficant bits represent valid data immediately. These nine bits represent the line number in the physical address which is being generated. In addition, bits 9 through 14 and 16 through 19 are applied to the A terminals of map 12 as best shown in FIG. 3. Together these bits form the address bits to map 12 to control the mapping operation. As shown in FIG. 3, map 12 produces 11 output bits identified as the physical address bits PA09 through PA19. These bits represent the page number in the mapped memory.

Figure 8:
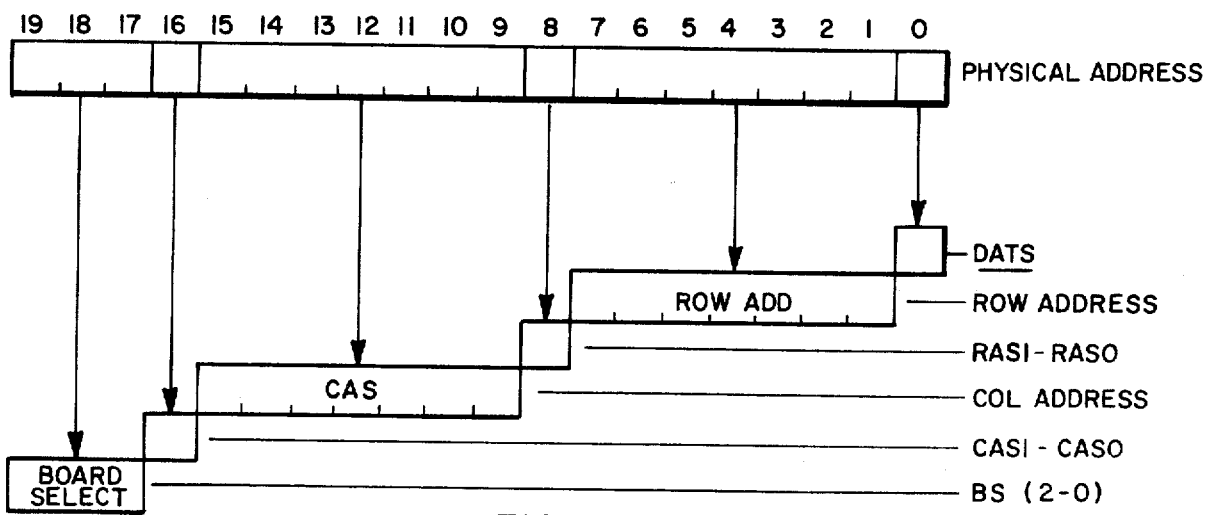
FIG. 8 is a schematic representation of the translation of a physical address onto the array bus.

Referring now to FIG. 8, there is shown diagramatically, how the physical address, when formed, is utilized to control the circuit operation. That is, the initial bit, namely IB00, is supplied to external circuitry, such as a clocked flip-flop, for establishing by means of the binary 1 or 0 state thereof the data selection function DATS to select the proper data word from the main memory in the multiword application of the invention. The next seven bits, namely IB1-IB7 are used to define the row address and are applied immediately to the array address multiplexer 16 as shown in FIGS. 1 and 5. Bit IB08 is defined as the row address strobe (RAS) signal and is either a binary 1 or a binary 0 and, thus, strobes the row address into the main memory. The next seven bits in the physical address, namely bits IB9 through IB15 define the column address and are applied to the column address latch circuit 14 as shown in FIG. 1. Physical address bit IB16 is the column address strobe (CAS) signal and is a binary 1 or 0 which effectively strobe the column address into the main memory. Physical address bits IB17 through IB19 are the board select signals (BS2-0) and provide the appropriate coding for selecting one of eight boards in the instant embodiment. It should be noted that the signals RAS, CAS and DATS are especially pertinent to memory decoding operations and not to the mapping function, per se. However, these signals are defined herein for information purposes. Furthermore, both RAS and CAS are decoded in the map. This decreases the total power consumption in the memory array and minimizes power current spikes which lead to random chip failures.

It should be understood, also, that address bit IB08 is used to decode the RAS signal because it is the most significant bit available at the beginning of the memory cycle. Bits 19-09 are, in general, obtained from map RAM outputs and are, therefore, not valid until after RAS has occurred. CAS is decoded using the most significant bit to each array IB16.

Thus, there has been shown and described a novel memory mapping technique and arrangement. In one embodiment, the memory map interfaces directly from the data bus to the memory array boards. Upon receipt of a mapped request, the map will immediately begin a memory cycle using the least significant address bits for a "row address" for the memory array. At the same time, the mapping occurs. When the mapping is complete, the "column address" is presented to the arrays. Thus, the mapping need not wait for one part of the technique to be completed before starting the next part. In one application, the entire operation, i.e. mapped cycle, can be completed in 600 nanoseconds. Also, the technique permits the extension of the 32K virtual address space to 1024K of physical memory. Consequently, enhanced memory applications are possible without any depletion in performance level. The specific circuits shown and described are illustrative of a preferred embodiment of the invention. These circuits are not intended to be limitative. Rather, the scope of the invention is limited only by the claims appended hereto.

Having thus described a preferred embodiment of the invention, what is claimed is:

1. A memory mapping apparatus comprising,
a source of original address information wherein said original address information is comprised of a specified number of bits;
memory map means connected to receive a first portion of said original address information directly from said source;
multiplexer means connected to receive a different portion of said original address information directly from said source;
memory means connected to said memory map means to concurrently supply memory information directly to said memory map means; and
means connected between said memory map means and said multiplexer means and operative to supply map information to said multiplexer means from said memory map means,
said multiplexer means providing new address information representative of said map information and said different portion of said original address information wherein said new address information includes mapped information from said memory via said memory map means.

2. The apparatus recited in claim 1 including:
physical address drivers connected to selectively receive said first portion of said original address information from said source when said apparatus is in a non-mapping mode.

3. The apparatus recited in claim 1, wherein:
said source includes input latch means for latching information from said source thereby to preserve the information in a useful format.

4. The apparatus recited in claim 1 including:
map array driver means for selectively returning information to said memory means from said memory map.

5. The apparatus recited in claim 1, wherein said first portion of said original address information comprises the most significant bits in the information; and
said different portion of said original address information comprises the least significant bits of the information.

6. The apparatus recited in claim 1, wherein:
said memory map means and said multiplexer means are connected to receive the respective portions of the original address information at substantially the same time in relation to an operating cycle of the apparatus.

7. The apparatus recited in claim 3, wherein:
said source includes bus-means connected to transfer information from said input latch means to said memory map means and said multiplexer means.

8. The apparatus recited in claim 1, wherein:
said latch means produces output signals for selecting portions of the memory means for operation.

9. The apparatus recited in claim 1, wherein:
said memory map means includes a plurality of memory circuits connected said memory means.

10. The method of mapping a memory comprising:
supplying information bits which represent a virtual memory address;
applying some of the information bits directly to a multiplexer;
concurrently applying others of the information bits directly to a memory map array;
decoding the others of the information bits in said memory map array and applying the decoded information to said multiplexer; and
selectively multiplexing the information supplied to said multiplexer to produce an output signal representative of the mapping operation.

11. The apparatus recited in claim 1 wherein,
said original address information may be in the form of a virtual address or a physical address.

12. The apparatus recited in claim 1 wherein
said memory means include row and column addresses.

13. The apparatus recited in claim 12 wherein,
said memory map effectively selects the column addresses in said memory means.

14. The method recited in claim 10 wherein,
said decoding step includes applying said others of the information bits to a memory map array to select the decoded information from a memory means.

15. The method recited in claim 14 wherein
said output signal is varied as a function of the information bits from said memory map array and said some of said information bits applied thereto.

16. The apparatus recited in claim 1 wherein,
said first portion of said address information and said different portion of said address information comprise the entirety of said address information.

* * * * *